US007828972B2

(12) United States Patent
Ham et al.

(10) Patent No.: US 7,828,972 B2

(45) Date of Patent: Nov. 9, 2010

(54) SELF-RECIPROCATING ENERGY RECOVERY DEVICE

(75) Inventors: Young-Bog Ham, Daejeon (KR); Sang-Jin Park, Daejeon (KR); Tae-Woo Kong, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 266 days.

(21) Appl. No.: 12/251,615

(22) Filed: Oct. 15, 2008

(65) Prior Publication Data

US 2009/0308796 A1 Dec. 17, 2009

(30) Foreign Application Priority Data

Jun. 11, 2008 (KR) ..................... 10-2008-0054470

(51) Int. Cl.
*B01D 61/08* (2006.01)
*B01D 61/06* (2006.01)

(52) U.S. Cl. ................. 210/321.66; 417/404; 417/505; 417/510; 210/110

(58) Field of Classification Search ............ 210/321.66
See application file for complete search history.

(56) References Cited

U.S. PATENT DOCUMENTS

| | | | | |
|---|---|---|---|---|
| 1,776,416 | A | 9/1930 | Cornell | |
| 3,688,645 | A | 9/1972 | Reaves | |
| RE32,144 | E * | 5/1986 | Keefer | 210/637 |
| 4,632,754 | A * | 12/1986 | Wood | 210/257.2 |
| 5,154,820 | A * | 10/1992 | Solomon | 210/134 |
| 5,306,428 | A | 4/1994 | Tonner | |
| 5,503,736 | A * | 4/1996 | Schoenmeyr | 210/91 |
| 6,491,813 | B2 * | 12/2002 | Verde | 210/137 |
| 2003/0017061 | A1 | 1/2003 | Pares Criville | |
| 2004/0173528 | A1 * | 9/2004 | Herrington et al. | 210/637 |
| 2005/0249619 | A1 * | 11/2005 | El-Sayed et al. | 417/505 |
| 2006/0037907 | A1 * | 2/2006 | Shumway | 210/416.1 |

FOREIGN PATENT DOCUMENTS

| | | |
|---|---|---|
| DE | 103 10 662 A1 | 9/2004 |
| EP | 0 028 913 A1 | 5/1981 |

* cited by examiner

*Primary Examiner*—Krishnan S Menon
(74) *Attorney, Agent, or Firm*—Seed IP Law Group PLLC

(57) ABSTRACT

Disclosed is a self-reciprocating energy recovery device utilized in driving of a seawater pump by self-reciprocating a piston of a power recovery chamber and recovering energy not using an electronic drive unit but using the hydraulic power of concentrated water. The self-reciprocating energy recovery device including a pair of power recovery chambers having pistons therein respectively, a high-pressure concentrated supply pipe, a low-pressure concentrated discharge pipe, and a high-pressure seawater discharge pipe to enable the power recovery chambers to recover hydraulic power supplied through the high-pressure concentrated water supply pipe and utilize the hydraulic power in driving of a seawater pump.

16 Claims, 8 Drawing Sheets

62a
62b
62
6
63
631
63a
63b
61
61b
61a
81b
81
8
81a
83
831
83a
83b
82
82a
82b
4
5
73b
73a
741
74b
721
72
71
6
75b
B
1b
1a
11b
74a
11a
A
75a
76b
761
Drain
Drain
76a
2
3

Drain
Drain
A
B
2
3
4
5
6
8
71
72
721
73a
73b
741
74a
74b
75a
75b
61
61a
61b
62
62a
62b
63
63a
63b
631
81
81a
81b
82
82a
82b
83
83a
83b
831

Drain
Drain
A
B
1a
1b
11a
11b
2
3
4
5
6
8
61
61a
61b
62
62a
62b
63
63a
63b
632
64
641
642a
642b
643a
643b
73a
73b
741
74a
74b
75a
75b
76a
76b
81
81a
81b
82
82a
82b
83
83a
83b
832
84
841
842a
842b
843a
843b Drain
Drain
A
B
1a
1b
11a
11b
2
3
4
5
6
8
61
61a
61b
62
62a
62b
63
63a
63b
631
632
64
641
642a
642b
643a
643b
73a
73b
74a
74b
741
75a
75b
76a
76b
81
81a
81b
82
82a
82b
83
83a
83b
831
84
841
842a
842b
843a
843b

SELF-RECIPROCATING ENERGY RECOVERY DEVICE

BACKGROUND

1. Technical Field

The present invention relates generally to an energy recovery device for a desalination system and, more particularly, to a self-reciprocating energy recovery device utilized in driving of a seawater pump by self-reciprocating a piston of a power recovery chamber and recovering energy not using an electronic drive unit but using the hydraulic power of concentrated water.

2. Description of the Related Art

In general, in order to acquire freshwater from seawater, substances dissolved or floating in seawater need to be removed to satisfy the standards for water and drinking water. Desalination methods mainly include reverse osmosis and electric dialysis using special membranes, and evaporation for changing seawater into vapor to desalinate seawater, and also may use freezing and solar heat.

A desalination plant using electric dialysis uses semi-permeable membranes that entirely exclude ion materials dissolved in water and pass pure water to filter ionic materials dissolved in seawater.

A process using high pressure above standard osmosis pressure is needed to separate ionic materials and pure water from seawater is referred to reverse osmosis, and a high pressure of 42 to 70 bars is needed in desalination of seawater.

The operation of the desalination system using reverse osmosis is as follows.

First, the seawater introduced from the sea is supplied through a low-pressure pump for reverse osmosis via a pretreatment process.

Some of the seawater supplied through the low-pressure pump is supplied to a membrane after being pressurized by a high-pressure pump, and some of the seawater supplied to the membrane is discharged to treated water from which salt is removed by reverse osmosis and the remainder is supplied to an energy recovery device as high-pressure concentrated water.

The energy recovery device includes a pair of power recovery chambers recovering hydraulic power of concentrated water, a plurality of check valves for interrupting the seawater supplied to the power recovery chambers, and an electric actuator drive spool valve for controlling pistons inside the power recovery chambers to alternately reciprocate.

In a simple explanation of the operation of such an energy recovery device, some of the high-pressure seawater that has passed through a high-pressure pump is discharged to treated water from which salt is removed through a membrane and the remainder is provided to the energy recovery device as high-pressure concentrated water.

High-pressure concentrated water is alternately supplied to the power recovery chambers by interrupting the electric actuator drive spool valve. Then, the pistons are moved by the pressure of the high-pressure concentrated water, whereby high-pressure seawater is supplied to a membrane module and low-pressure seawater is selectively supplied to the power recovery chambers through a boost pump by selective opening/closing of a check valve.

In the desalination system using reverse osmosis, the energy recovery device can make the capacities of the low-pressure pump and the high-pressure pump smaller and the power of electric motors driving the low-pressure pump and the high-pressure pump less by recovering the hydraulic power of the concentrated water that has been treated in the membranes, saving energy.

However, such an energy recovery device separately includes a chamber having a cylindrical piston to use hydraulic pressure in reverse osmosis, and a linearly moved spool valve selectively controlling driving of a cylindrical piston in the chamber.

In other words, since the rotational movement of the electric motor needs to be converted to linear movement and the electric actuator drive spool valve such as an electric linear motor and a proportional control valve needs to be provided outside a chamber, the device becomes complex and the size of the device increases.

In order to overcome the above-mentioned disadvantages, the present applicant has disclosed an energy recovery device in Korean Patent Application No. 2008-0054464.

The technology enables reduction of the size of the device, precise control of the device, and linear flow of fluid by using a conventional spool valve selectively supplying concentrated water to a power recovery chamber as a concentrated water control valve block having a fluctuating plate-like concentrated water valve and directly controlling rotation using an electric motor.

However, since the technology uses a separate electric motor for driving a fluctuating plate-like concentrated water valve, power for driving of an electric motor is consumed and a waterproof structure for interrupting contact with water is needed, making the device complex and larger.

BRIEF SUMMARY

The present invention has been made in view of the above problems, and the present invention provides a self-reciprocating energy recovery device that can reciprocally move pistons in power recovery chambers without using any external electric drive actuator or electronic valve, using a fluctuating actuator integrated plate valve fluctuating by a high pressure of concentrated water by selectively interrupting high pressure of the concentrated water without using a drive unit by a separate electric drive.

In order to achieve the object, the present invention provides a self-reciprocating energy recovery device including a pair of power recovery chambers having pistons therein respectively, a high-pressure concentrated supply pipe, a low-pressure concentrated discharge pipe, and a high-pressure seawater discharge pipe to enable the power recovery chambers to recover hydraulic power supplied through the high-pressure concentrated water supply pipe and utilize the hydraulic power in driving of a seawater pump, the energy recovery device comprising: a concentrated water control valve block selectively interrupting introduction and discharge of concentrated water to and from the power recovery chambers through fluctuation of a fluctuating plate-like concentrated water valve having pinion gear teeth on the outer peripheral surface thereof; a rack gear having rack gear teeth enmeshed with the pinion gear teeth and inserted into opposite spools; first and second high-pressure concentrated water pilots branched out from the high-pressure concentrated water supply pipe to pilots and connected to sides of the spools to alternately supply high-pressure concentrated water; first and second high-pressure concentrated water pilot valve interrupting supply of high-pressure concentrated water to the first and second high-pressure concentrated water pilots respectively; first and second low-pressure concentrated water pilots connected to opposite sides of the spools to discharge low-pressure concentrated water; and first and second low-pressure concentrated water pilot valves interrupting discharge of low-pressure concentrated water through the first and second low-pressure concentrated water pilots.

The concentrated water control valve block includes: a concentrated water chamber cover having chamber ports communicated with the power recovery chambers respectively; a concentrated water inlet/outlet cover having a concentrated water supply hole communicated with the high-pressure concentrated water supply pipe and a concentrated water outlet hole communicated with the low-pressure concentrated water supply pipe; and a fluctuating plate-like concentrated water valve functioning as a hydrostatic bearing by a pressure of supplied water between the concentrated water chamber cover and the concentrated water inlet/outlet cover and having opened holes.

The self-reciprocating energy recovery device further comprises a fluctuating plate-like check valve block provided on one side of the power recovery chambers and connected to the fluctuating plate-like concentrated water valve, the fluctuating plate-like check valve block being moved in association with the fluctuation of the fluctuating plate-like concentrated valve to selectively interrupt introduction and discharge of seawater to and from the first power recovery chamber and the second power recovery chamber.

The fluctuating plate-like check valve block includes: a seawater chamber cover having chamber ports communicated with the power recovery chambers respectively; a seawater inlet/outlet cover having a seawater supply hole connected to the low-pressure seawater supply pipe and a seawater outlet hole connected the high-pressure seawater discharge pipe; and a fluctuating plate-like concentrated water valve functioning as a hydrostatic bearing by a pressure of supply water between the seawater chamber cover and the seawater inlet/outlet cover and having opened holes.

The first and second high-pressure concentrated water pilot valves and the first and second low-pressure concentrated water pilot valves pass through sides of the power recovery chambers and are connected to resilient members outside the power recovery chambers.

The present invention also provides a self-reciprocating energy recovery device including a pair of power recovery chambers having pistons therein respectively, a high-pressure concentrated supply pipe, a low-pressure concentrated discharge pipe, and a high-pressure seawater discharge pipe to enable the power recovery chambers to recover hydraulic power supplied through the high-pressure concentrated water supply pipe and utilize the hydraulic power in driving of a seawater pump, the energy recovery device comprising: a fluctuating plate-like concentrated water valve having a fixed vane to selectively interrupt introduction and discharge of concentrated water to and from the first power recovery chamber and the second power recovery chamber through fluctuation thereof; a fluctuating plate-like concentrated water valve block having a space into which the fluctuating plate-like concentrated water valve and in which the fixed vane is accommodated and a first block outlet hole and a first block inlet hole, and a second block outlet hole and a second block inlet hole symmetrically disposed on opposite sides of the space; first and second high-pressure concentrated water pilots branched out from the high-pressure concentrated water supply pipe to pilots and connected to the first and second block inlet holes to alternately supply the high-pressure concentrated water; first and second high-pressure concentrated pilot valves interrupting supply of high-pressure concentrated water to the first and second high-pressure concentrated water pilots; first and second low-pressure concentrated water pilots connected to the first and second block outlet holes to alternately discharge the low-pressure concentrated water; and first and second low-pressure concentrated water pilot valves interrupting discharge of low-pressure concentrated water through the first and second low-pressure concentrated water pilots.

The fluctuating plate-like concentrated water valve block includes: a concentrated water chamber cover having chamber ports communicated with the power recovery chambers respectively; a concentrated water inlet/outlet cover having a concentrated water supply hole communicated with the high-pressure concentrated water supply pipe and a concentrated water outlet hole communicated with the low-pressure concentrated water supply pipe; and a fluctuating plate-like concentrated water valve functioning as a hydrostatic bearing by a pressure of supplied water between the concentrated water chamber cover and the concentrated water inlet/outlet cover and having opened holes.

The self-reciprocating energy recovery device further comprises: a fluctuating plate-like check valve provided on one side of the power recovery chambers and having a fixed vane at the outer periphery thereof to selectively interrupt introduction and discharge of seawater into and from the first power recovery chamber and the second power recovery chamber through fluctuation thereof; a fluctuating plate-like concentrated water valve block having a space into which the fluctuating plate-like concentrated water valve and in which the fixed vane is accommodated and a first block outlet hole and a check valve block having a first block inlet hole, and a second block outlet hole and a second block inlet hole symmetrically disposed on opposite sides of the space; wherein the first and second high-pressure concentrated water pilots alternately supplying high-pressure concentrated water are connected to the first and second check valve inlet holes, and first and second low-pressure concentrated water pilots alternately discharging low-pressure concentrated are connected to the first and second check valve outlet holes.

The fluctuating plate-like check valve block includes: a seawater chamber cover having chamber ports communicated with the power recovery chambers respectively; a seawater inlet/outlet cover having a seawater supply hole connected to the low-pressure supply pipe and a seawater outlet hole connected to the high-pressure seawater discharge pipe; and a fluctuating plate-like check valve functioning as a hydrostatic bearing by a pressure of supply water between the seawater chamber cover and the seawater inlet/outlet cover and having opened holes.

The first and second high-pressure concentrated water pilot valves and the first and second low-pressure concentrated water pilot valves pass through sides of the power recovery chambers and are connected to resilient members outside the power recovery chambers.

The present invention enables self-reciprocating movement of pistons by recovering high-pressure power by hydraulic pressure of concentrated water with no power unit by an electric drive, increasing energy saving efficiency. Furthermore, the present invention does not use an electric drive in an environment in which water is treated, increasing the reliability of operation of a device.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Figure 1:
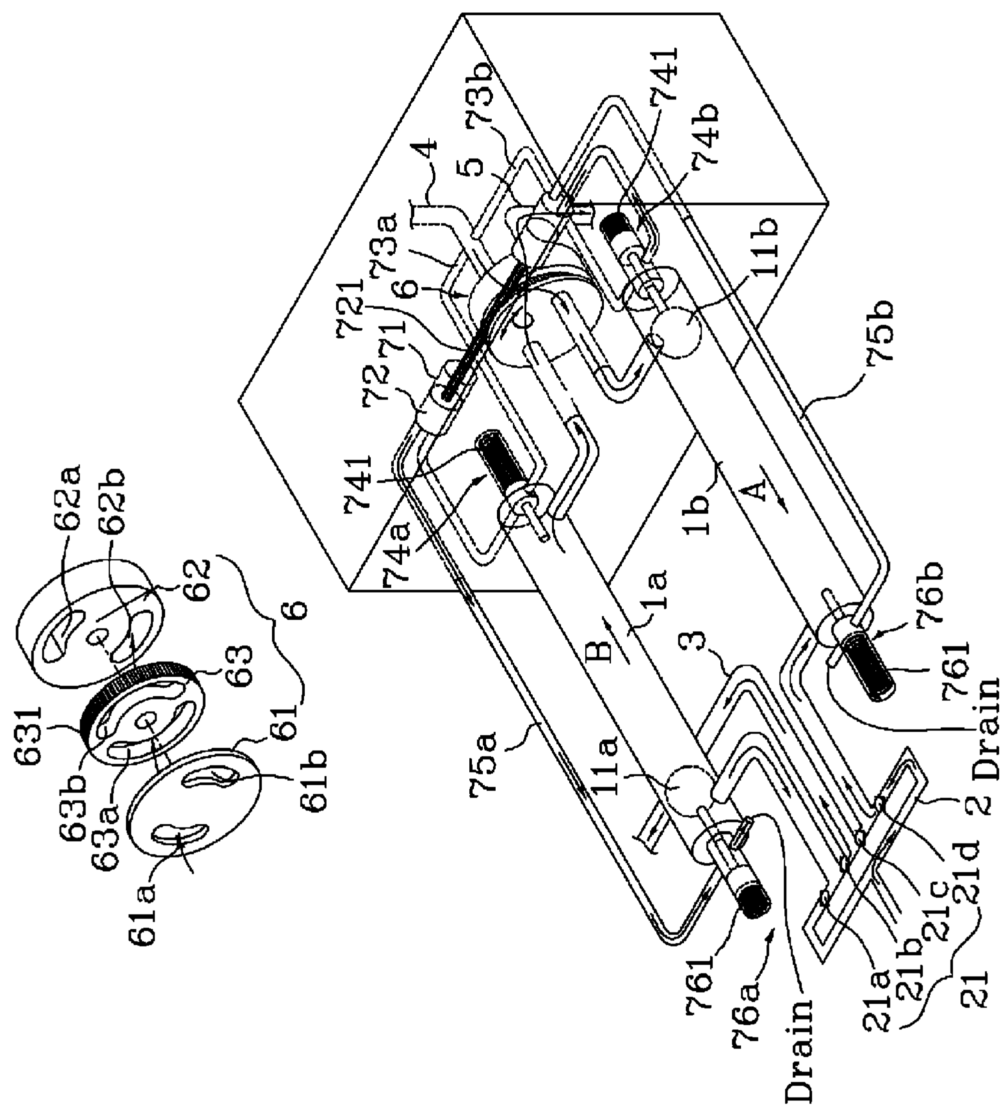
FIGS. 1 and 2 are views illustrating the structure and operation of a self-reciprocating energy recovery device according to the first embodiment of the present invention.
Figure 2:
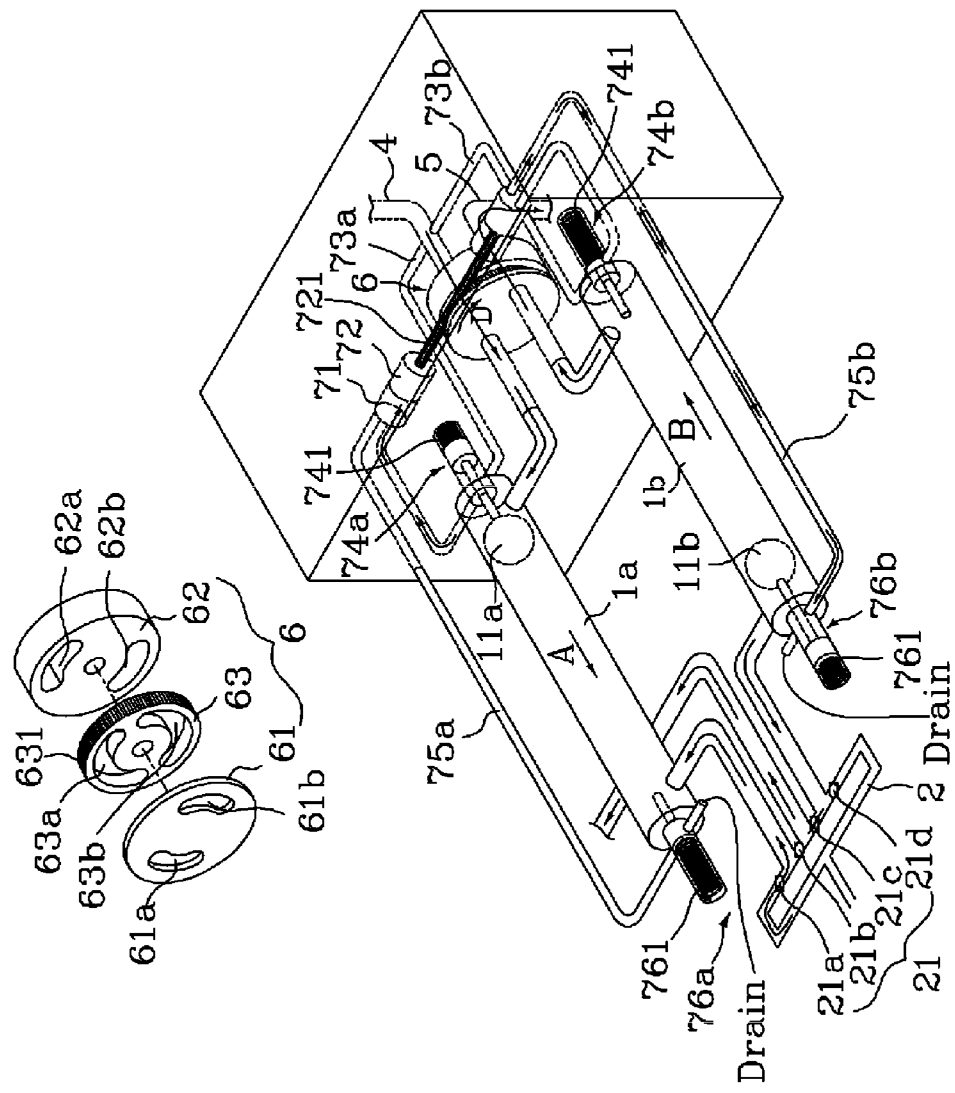

FIGS. 1 and 2 are views illustrating the structure and operation of a self-reciprocating energy recovery device according to the first embodiment of the present invention. The present invention relates to a self-reciprocating energy recovery device utilized in driving of a seawater pump by recovering hydraulic power of high-pressure concentrated water from a power recovery chamber in discharging treated water and concentrated water obtained by removing salt from sea water using reverse osmosis.

Referring to FIGS. 1 and 2, the self-reciprocating energy recovery device includes a pair of power recovery chambers 1*a* and 1*b*, a low-pressure seawater supply pipe 2, a high-pressure seawater discharge pipe 3, a high-pressure concentrated water supply pipe 4, a low-pressure concentrated water discharge pipe 5, a concentrated water control value block 6, a pair of high-pressure concentrated water pilots 73*a* and 73*b*, a pair of high-pressure concentrated water pilot valves 74*a* and 74*b*, a pair of low-pressure concentrated water pilots 75*a* and 75*b*, and a pair of low-pressure concentrated water pilot valves 76*a* and 76*b*.

The pair of power recovery chambers 1*a* and 1*b* are a first power recovery chamber 1*a* and a second power recovery chamber 1*b* having pistons 11*a* and 11*b* therein respectively, and alternately introduce and discharge concentrated water.

Then, the pistons 11*a* and 11*b* may be floating ball-shaped pistons reciprocating inside the chambers without using piston rods.

The high-pressure concentrated water treated by a membrane module (not shown) is supplied to the high-pressure concentrated water pipe 4, and the low-pressure concentrated water that has been used in recovery of energy in the power recovery chambers 1*a* and 1*b* is discharged through the low-pressure concentrated water discharge pipe 5.

The low-pressure seawater supplied through a low-pressure pump (not shown) is supplied to the power recovery chambers 1*a* and 1*b* through the low-pressure seawater supply pipe 2, and the high-pressure seawater that has been used in the power recovery chambers 1*a* and 1*b* is discharged to the high-pressure seawater discharge pipe 3 through a boost pump (not shown) and is supplied to a membrane (not shown).

The concentrated water control valve block 6 functions as a valve selectively interrupting introduction and discharge of concentrated water to the first power recovery chamber 1*a* and the second power recovery chamber 1*b* through fluctuation of a fluctuating plate-like concentrated water valve 63 having pinion gear teeth 631 on the outer peripheral surface thereof.

In this case, the concentrated water control valve block 6 includes a concentrated water chamber cover 61 functioning as a hydrostatic bearing using the pressure of supplied water, a concentrated water inlet/outlet cover 62, and a fluctuating plate-like concentrated valve 63.

A first concentrated water chamber port 61*a* communicated with the first power recovery chamber 1*a* and a second concentrated water chamber port 61*b* are formed in the concentrated water chamber cover 61. The ports 61*a* and 61*b* may be circular or arc shaped.

A concentrated water supply hole 62*a* communicated with the high-pressure concentrated water supply pipe 4 and a concentrated water discharge hole 62*b* communicated with the low-pressure concentrated water discharge pipe 5 are formed in the concentrated water inlet/outlet cover 62. The concentrated water supply hole 62*a* and the concentrated water discharge hole 62*b* may be circular or arc shaped.

The fluctuating plate-like concentrated water valve 63 is provided between the concentrated water chamber cover 61 and the concentrated water inlet/outlet cover 62. Holes 63*a* and 63*b* selectively communicating the concentrated water chamber ports 61*a* and 61*b* and the concentrated water supply hole 62*a*, and the concentrated water chamber ports 61*a* and 61*b* and the concentrated water discharge hole 62*b*, by rotating the fluctuating plate-like concentrated water valve 63 are formed in the fluctuating plate-like concentrated water valve 63. For example, the holes 63*a* and 63*b* may be circular or arc shaped.

Then, a plurality of pinion gear teeth 631 are formed on the outer peripheral surface of the fluctuating plate-like concentrated water valve 63, and a rack gear 72 having rack gear teeth 721 enmeshed with the pinion gear teeth 631 is formed on the fluctuating plate-like concentrated water valve 63.

In this case, the rack gear 72 is inserted into opposite spools 71 and is linearly reciprocated by the high-pressure concentrated water supplied to opposite ends of the spools 71.

In other words, the first and second high-pressure concentrated water pilots 73*a* and 73*b* branched out from the high-pressure concentrated water supply pipes 4 are connected to opposite sides of the spools 71, and the rack gear 72 is linearly reciprocated by the pressure of the high-pressure concentrated water alternately supplied through the high-pressure concentrated water pilots 73*a* and 73*b*.

Then, the high-pressure concentrated water supplied to the opposite sides of the spools 71 is selectively interrupted by the first and second high-pressure concentrated water pilot valves 74*a* and 74*b*.

The first and second high-pressure concentrated water pilot valves 74*a* and 74*b* pass through the power recovery chambers 1*a* and 1*b* lengthwise and are connected to resilient members 741 located outside the power recovery chambers 1*a* and 1*b*.

Due to the above-mentioned structure, the first and second high-pressure concentrated water pilot valves 74*a* and 74*b* selectively open the first and second high-pressure concentrated water pilots 73*a* and 73*b* by adhesion of pistons in order to alternately supply the concentrated water to the opposite sides of the spools 71.

The first and second low-pressure concentrated water pilots 75*a* and 75*b* for discharging the low-pressure concentrated water are connected to the opposite sides of the spools 71, and the first and second low-pressure concentrated water pilot valves 76*a* and 76*b* are provided on the other sides of the power recovery chambers 1*a* and 1*b*.

The first and second low-pressure concentrated water pilot valves 76*a* and 76*b* pass through the power recovery chambers 1*a* and 1*b* lengthwise and are connected to the resilient members 761 outside the power recovery chambers 1*a* and 1*b* respectively, so that the first and second low-pressure concentrated water pilots 75*a* and 75*b* are selectively opened by adhesion of the pistons inside the power recovery chambers 1*a* and 1*b* whereby the low-pressure concentrated water of the spools 71 is discharged.

A plurality of ball type check valves 21 for interrupting supply of low-pressure seawater to the first and second power recovery chambers 1*a* and 1*b* and supply of high-pressure sea water to the high-pressure sea water discharge pipe 3 are provided at a connection section of the low-pressure sea water supply pipe 2 and the high-pressure seawater discharge pipe 3.

In this case, the plurality of check valves 21 include a first check valve 21*a* for supplying low-pressure seawater to the first power recovery chamber 1*a*, a second check valve 21*b* for interrupting supply of the high-pressure seawater pressurized by the first power recovery chamber 1*a* to the high-pressure seawater discharge pipe 3, a third check valve 21*c* for interrupting supply of the high-pressure seawater pressurized by the second power recovery chamber 1*b* to the high-pressure seawater discharge pipe 3, and a fourth check valve for supplying the low-pressure seawater to the second power recovery chamber 1*b*.

Hereinafter, the operation of the self-reciprocating energy recovery device according to the first embodiment of the present invention will be described in detail with reference to FIGS. 1 and 2.

First, as illustrated in FIG. 1, if the piston 11*a* in the first power recovery chamber 1*a* is moved in the direction of A, the first low-pressure concentrated water control valve 76*a* is opened by adhesion of the piston 11*a*, and if the piston 11*b* in the second power recovery chamber 1*b* is moved in the direction of B, the piston 11*b* is opened to open the second high-pressure concentrated pilot valve 74*b*.

The high-pressure concentrated water is supplied to the spool 71 on one side of the rack gear 72 through the second high-pressure concentrated water pilot 73*b* when the valves are opened.

Then, the rack gear 72 is linearly reciprocated due to the high pressure applied to one side of the rack gear 72 by the concentrated water, the pinion gear teeth 631 are enmeshed with the rack gear teeth 721 of the rack gear 72, rotating the fluctuating plate-like concentrated water valve 63, and the low-pressure concentrated water accommodated on the opposite side of the rack gear 72 is discharged to a drain through the first low-pressure concentrated water pilot 75*a*.

In this case, the rack gear 72 may be arbitrarily driven manually by rotation of the fluctuating plate-like concentrated valve 63 during the initial driving of the rack gear 72 or by stopping the rack gear 72.

Then, the second concentrated water chamber port 61*b* and the second concentrated chamber port 61*b* are communicated with each other by rotation of the fluctuating plate-like concentrated water valve 63 whereby the first concentrated water chamber port 61*a* and the concentrated water discharge hole 62*b* are communicated with each other.

The low-pressure seawater supply pipe 2 and the first power recovery chamber 1*a* are communicated with each other by opening the first check valve 21*a* and closing the second check valve 21*b*, and the high-pressure seawater discharge pipe 3 and the second power recovery chamber 1*b* are communicated with each other by opening the third check valve 21*c* and closing the fourth check valve 21*d*.

Accordingly, the high-pressure concentrated water is introduced into the second power recovery chamber 1*b* so that if the second piston 11*b* is moved in the direction of A, the high-pressure seawater is discharged to the high-pressure seawater discharge pipe 3, and the low-pressure seawater is introduced from the low-pressure seawater supply pipe 2 to the first power recovery chamber 1*a* so that the first piston 11*a* is moved in the direction of B whereby the low-pressure concentrated water is discharged to the low-pressure concentrated water discharge pipe 5.

As illustrated in FIG. 2, if the first piston 11*a* is moved in the direction of B and the second piston 11*b* is moved in the direction of A, the first high-pressure concentrated water pilot valve 74*a* and the second low-pressure concentrated water pilot valve 76*b* are opened so that the high-pressure concentrated water is supplied to the spool 71 on the opposite side of the rack gear 72.

Then, since a high pressure is applied to the opposite side of the rack gear 72 by the concentrated water, the rack gear 72 is linearly reciprocated whereby the low-pressure concentrated water accommodated on one side of the rack gear 72 is discharged to a drain through the second low-pressure concentrated water pilot 75*b* and the pinion gear teeth 631 are enmeshed with the rack gear teeth 721 of the rack gear 72, rotating the fluctuating plate-like concentrated water valve 63.

The first concentrated water chamber port 61*a* and the concentrated water supply hole 62*a* are communicated with each other and the second concentrated water chamber port 61*b* and the concentrated water discharge hole 62*b* are communicated with each other, by rotation of the fluctuating plate-like concentrated water valve 63.

In addition, the high-pressure seawater discharge pipe 3 and the first power recovery chamber 1*a* are communicated with each other by closing the first check valve 21*a* and opening the second check valve 21*b*, and the low-pressure seawater supply pipe 2 and the second power recovery chamber 1*b* are communicated with each other by closing the third check valve 21*c* and opening the fourth check valve 21*d*.

Accordingly, as illustrated in FIG. 1, the high-pressure concentrated water is introduced into the first power recovery chamber 1*a* so that the first piston 11*a* is moved in the direction of A whereby the high-pressure seawater is discharged to the high-pressure seawater discharge pipe 3, and the low-pressure seawater is discharged from the low-pressure seawater supply pipe 2 to the second power recovery chamber 1*b* so that the second piston 11*b* is moved in the direction of B whereby the low-pressure concentrated water is discharged to the low-pressure concentrated water discharge pipe 5.

During repetition of the processes, the concentrated water is alternately introduced and discharged into and from the first power recovery chamber and the second power recovery chamber and the seawater is alternately introduced and discharged, so that the seawater is pressurized and supplied to the high-pressure seawater discharge pipe by self-reciprocating the pistons with any separate electric drive force.

However, since fluid needs to flow via a ball in the ball type check valve, a pressure resistance due to the flow resistance against the fluid is generated.

Figure 3:
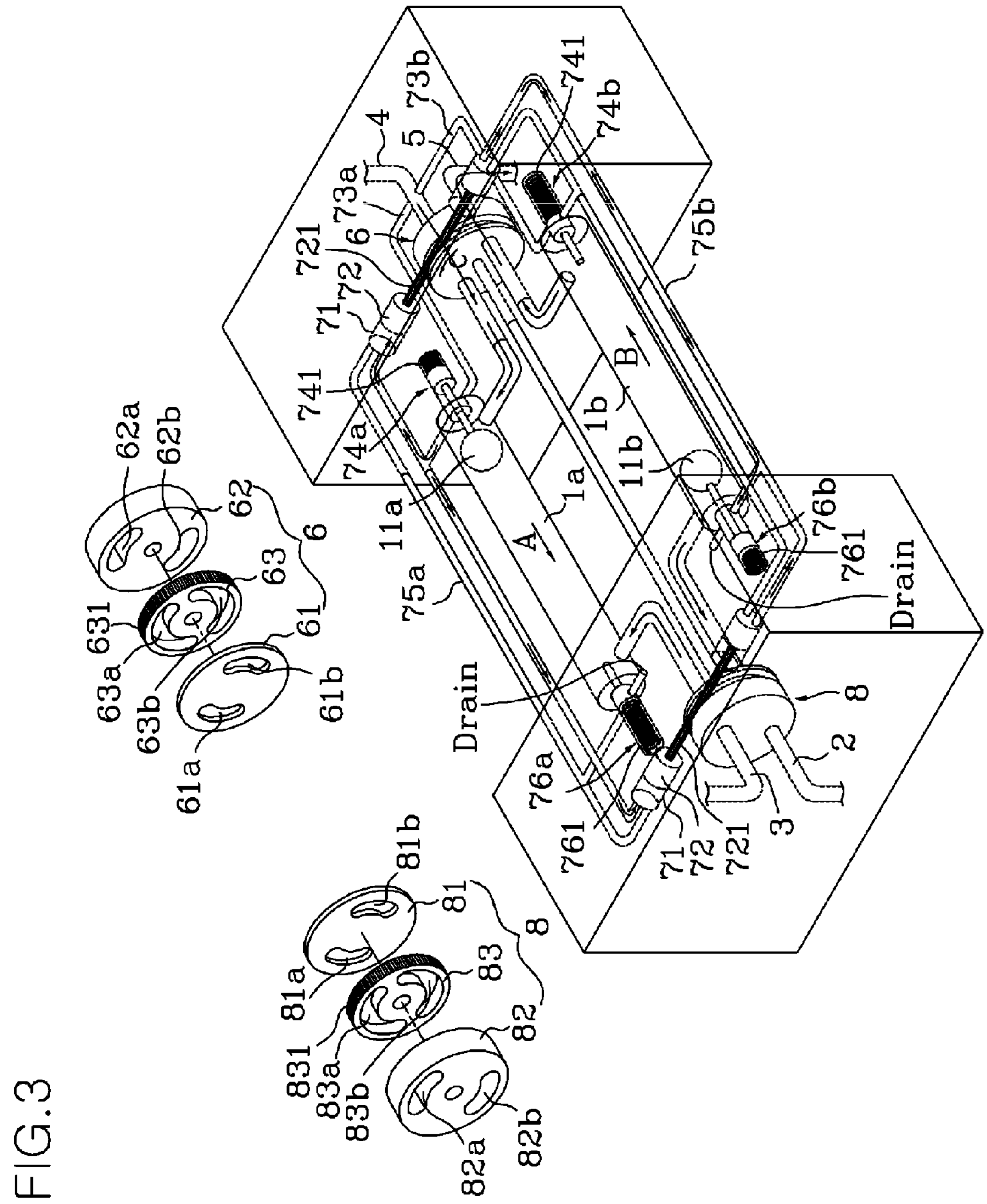
FIGS. 3 and 4 are views illustrating the structure and operation of a self-reciprocating energy recovery device according to the second embodiment of the present invention.
Figure 4:
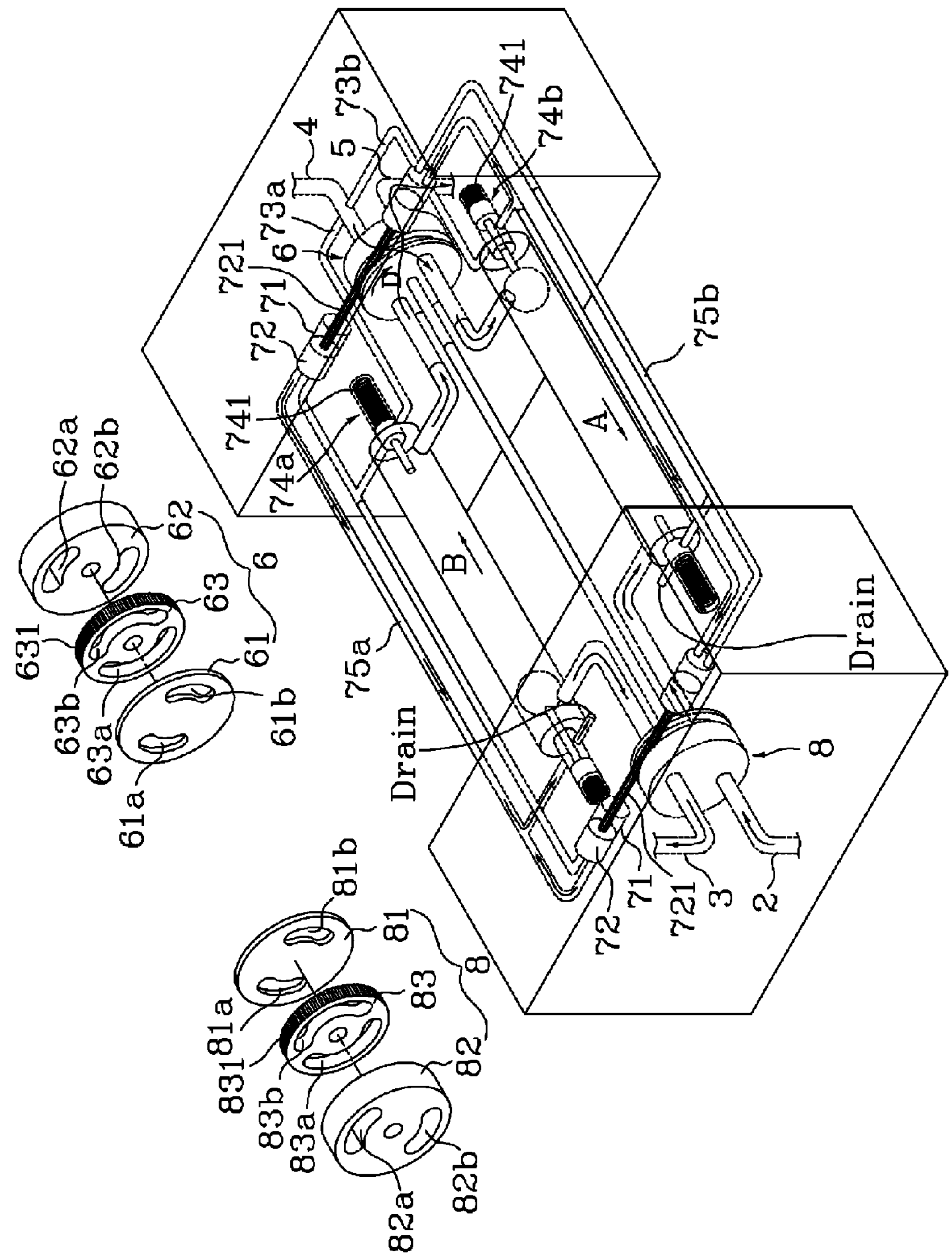

In order to improve the above disadvantage, a self-reciprocating energy recovery device according to the second embodiment of the present invention includes a fluctuating plate-like check valve as illustrated in FIGS. 3 and 4. In this case, detailed descriptions of the same structure and operation as those of the first embodiment of the present invention will be omitted.

The fluctuating plate-like check block 8 is located on one side of the pair of power recovery chambers 1*a* and 1*b* and is connected to the fluctuating plate-like concentrated water valve 63. Introduction and discharge of seawater into and from the first power recovery chamber 1*a* and the second power recovery chamber 1*b* are selectively interrupted by fluctuation of the fluctuating plate-like concentrated water valve 63.

In this case, the seawater chamber cover 81, the seawater inlet/outlet cover 82, and the fluctuating plate-like check valve block 8 function as a hydrostatic bearing by the pressure of the supplied water.

A first seawater chamber port 81*a* communicated with the first power recovery chamber 1*a* and a second seawater chamber port 81*b* communicated with the second power recovery chamber 1*b* are formed in the seawater chamber cover 81. The ports may be circular or arc shaped.

A seawater supply hole 82*a* connected to the low-pressure seawater supply pipe 2 and a seawater discharge hole 82*b* connected to the high-pressure seawater discharge pipe 3 are formed in the seawater inlet/outlet cover 82. The seawater supply hole 82*a* and the seawater discharge hole 82*b* may be circular or arc shaped.

Holes 83*a* and 83*b* for selectively communicating the seawater chamber ports 81*a* and 81*b* and the seawater supply hole 82*a*, and the seawater chamber ports 81*a* and 81*b* and the seawater discharge hole 82*b* by rotation of the fluctuating plate-like check valve 83 are formed in the fluctuating plate-like check valve 83. For example, the holes may be circular or arc shaped.

Then, a plurality of pinion gear teeth 831 are formed on the outer peripheral surface of the fluctuating plate-like check valve 83 for movement of the fluctuating plate-like check valve 83 that is associated with the fluctuating plate-like concentrated water valve 63, and a rack gear 72 has rack gear teeth 721 enmeshed with the pinion gear teeth 831.

In this case, the rack gear 72 is inserted into opposite spools 71 and is linearly reciprocated by the high-pressure concentrated water supplied to opposite ends of the spools 71.

The fluctuating plate-like check valve 83 is moved in association with rotation of the fluctuating plate-like concentrated water valve 63.

In other words, if the fluctuating plate-like concentrated water valve 63 is rotated in the direction of C, the fluctuating plate-like check valve 83 is simultaneously rotated together with the fluctuating plate-like concentrated water valve 63, so that the low-pressure seawater supply pipe 2 and the first power recovery chamber 1*a* are communicated with each other and the high-pressure seawater discharge pipe 3 and the second power recovery chamber 1*b* are communicated with each other.

In addition, if the fluctuating plate-like concentrated water valve 63 is rotated in the direction of D, the fluctuating plate-like check valve 83 is simultaneously rotated together with the fluctuating plate-like concentrated water valve 63, so that the low-pressure seawater supply pipe 2 and the second power recovery chamber 1*b* are communicated with each other and the high-pressure seawater discharge pipe 3 and the first power recovery chamber 1*a* are communicated with each other.

Accordingly, since a check valve interrupting introduction and discharge of seawater into the power recovery chambers in the second embodiment of the present invention is realized by a fluctuating plate-like check valve, the flow resistance generated by balls of a conventional ball type check valve is prevented, making the flow of fluid linear.

Figure 5:
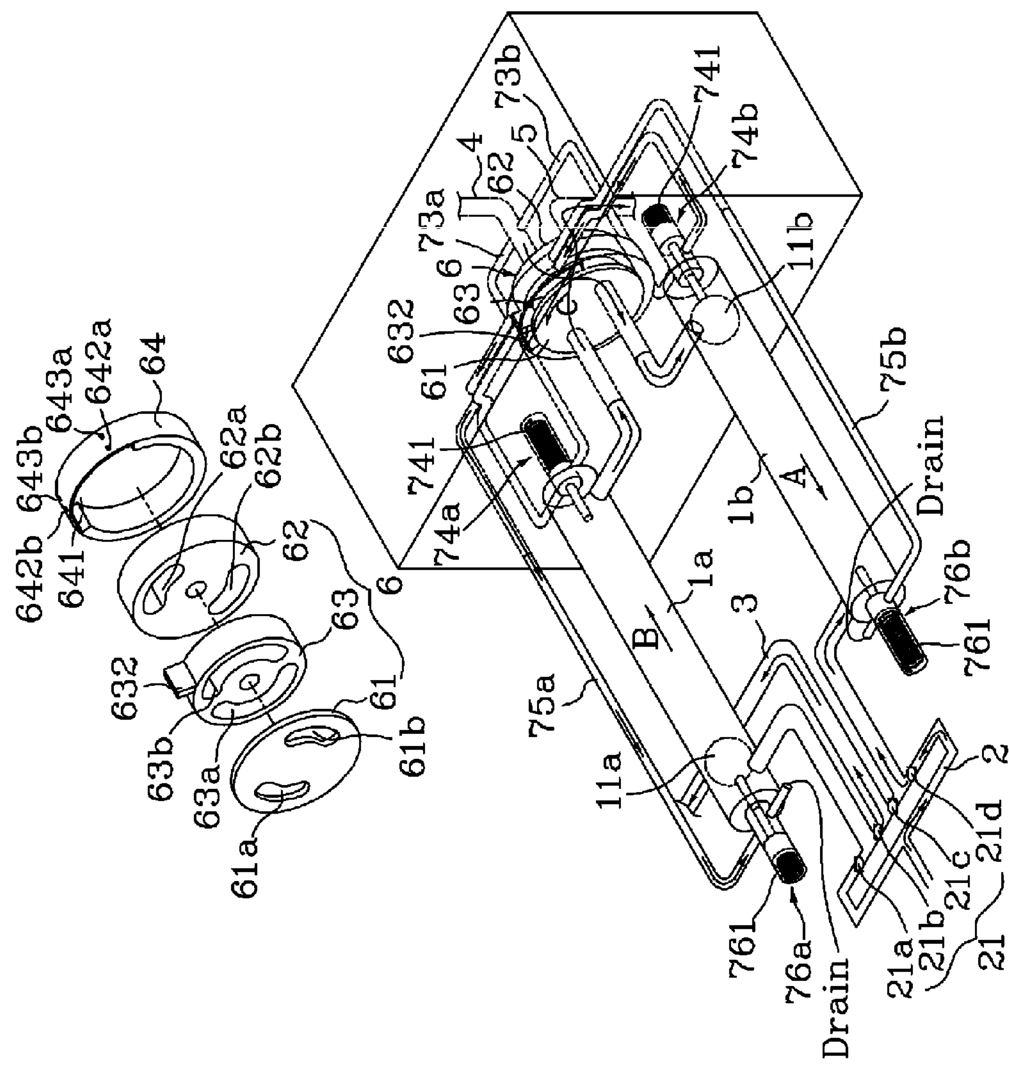
FIGS. 5 and 6 are views illustrating the structure and operation of a self-reciprocating energy recovery device according to the third embodiment of the present invention.
Figure 6:
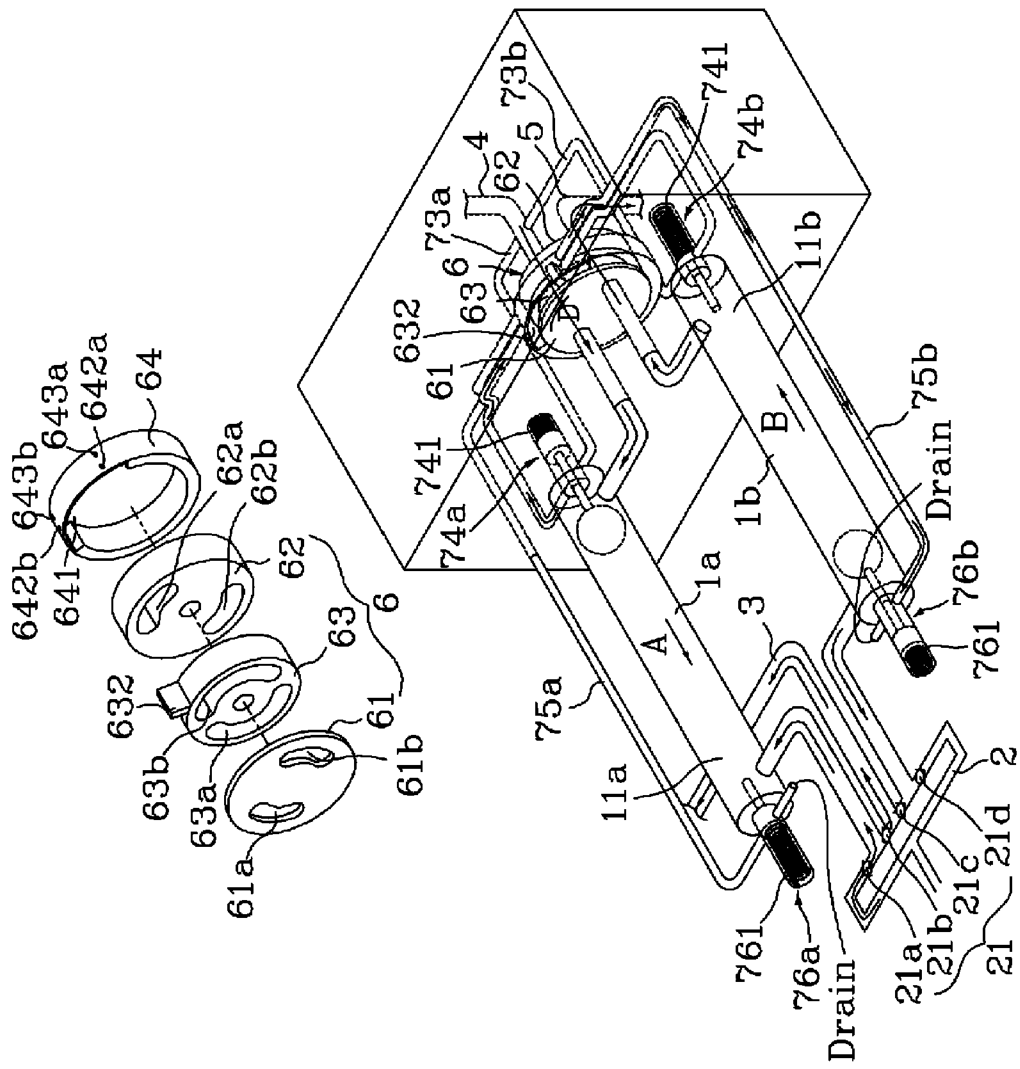

FIGS. 5 and 6 are views illustrating the structure and operation of a self-reciprocating energy recovery device according to the third embodiment of the present invention. In this case, detailed descriptions of the same structure and operation as those of the first and second embodiments of the present invention will be omitted.

The self-reciprocating energy recovery device according to the third embodiment of the present invention includes a pair of power recovery chambers 1*a* and 1*b*, a low-pressure seawater supply pipe 2, a high-pressure seawater discharge pipe 3, a high-pressure concentrated water supply pipe 4, a low-pressure concentrated water discharge pipe 5, a concentrated water control valve block 6, a rack gear 72, a pair of high-pressure concentrated water pilots 73*a* and 73*b*, a pair of high-pressure concentrated water pilot valves 74*a* and 74*b*, a pair of low-pressure concentrated water pilots 75*a* and 75*b*, and a pair of low-pressure concentrated water pilot valves 76*a* and 76*b*.

The concentrated water control valve block 6 functions as a valve for selectively interrupting introduction and discharge of the concentrated water to the first power recovery chamber 1*a* and the second power recovery chamber 1*b*, and includes a fluctuating plate-like concentrated water valve 63 having a fixed vane 632 on the outer periphery thereof to selectively interrupt introduction and discharge of the concentrated water to the first power recovery chamber 1*a* and the second power recovery chamber 1*b* by the fluctuation thereof.

A concentrated water chamber cover 61 and a concentrated water inlet/outlet cover 62 functioning as a hydrostatic bearing by the pressure of supplied water are provided on both sides of the fluctuating plate-like concentrated water valve 63.

The fluctuating plate-like concentrated water valve 63 is inserted into the fluctuating plate-like valve block 64 having a space in which the fixed vane 632 is accommodated.

A first block inlet hole 642*a* and a first block outlet hole 643*a*, and a second block inlet hole 642*b* and a second block outlet hole 643*b* are symmetrically formed on opposite sides of the fluctuating plate-like concentrated water valve block 64.

First and second high-pressure concentrated water pilots 73*a* and 73*b* branched out from the high-pressure concentrated water supply pipe 4 to alternately supply high-pressure concentrated water are connected to the first and second block inlet holes 642*a* and 642*b*.

In addition, first and second low-pressure concentrated water pilots 75*a* and 75*b* alternately discharging low-pressure concentrated water are connected to the first and second block outlet holes 643*a* and 643*b*.

First and second high-pressure concentrated water pilot valves 74*b* pass through the power recovery chambers 1*a* and 1*b* lengthwise and are connected to resilient members 741 outside the power recovery chambers 1*a* and 1*b* to interrupt supply of high-pressure concentrated water to the first and second high-pressure concentrated water pilots 73*a* and 73*b*.

First and second low-pressure concentrated water pilot valves 76*b* pass through the power recovery chambers 1*a* and 1*b* lengthwise and are connected to resilient members 761 outside the power recovery chambers 1*a* and 1*b* to interrupt discharge of low-pressure concentrated water to the first and second low-pressure concentrated water pilots 75*a* and 75*b*.

Hereinafter, the operation of the self-reciprocating energy recovery device according to the third embodiment of the present invention will be described in detail.

Referring to FIG. 5, if the piston of the first power recovery chamber 1*a* is moved in the direction of A by the pressure of concentrated water and the piston of the second power recovery chamber 1*b* is moved in the direction of B, the second high-pressure concentrated water pilot valve 740 and the first low-pressure concentrated water pilot valve 76*a* are opened so that the high-pressure concentrated water is introduced into a first block inlet hole 642*a*.

Then, the fluctuating plate-like concentrated water valve 63 and the fluctuating plate-like check valve 83 are rotated in the direction of C by the high pressure due to the concentrated water introduced into the first block inlet hole 642*a* whereby the low-pressure concentrated water is discharged through the second block outlet hole 643*b* and through the first low-pressure concentrated water pilot 75*a*.

Then, when the fluctuating plate-like concentrated valve 63 is rotated in the direction of C, the second concentrated water chamber port 61*a* and the concentrated water supply hole 62*a* are communicated with each other and the first concentrated water chamber port 61*a* and the concentrated water outlet hole 62*b* are communicated with each other.

The low-pressure seawater supply pipe 2 and the first power recovery chamber 1*a* are communicated with each other by opening the first check valve 21*a* and closing the second check valve 21*b*, and the high pressure seawater discharge pipe 3 and the second power recovery chamber 1*b* are communicated with each other by opening the third check valve 21*c* and closing the fourth check valve 21*d*.

Accordingly, as illustrated in FIG. 6, when the high-pressure concentrated water is introduced into the second power recovery chamber 1*b*, the second piston 11*b* is moved in the direction of A whereby the high-pressure seawater is discharged to the high-pressure seawater discharge pipe 3, and when the low-pressure seawater is introduced from the low-pressure seawater supply pipe 2 to the first power recovery chamber 1*a*, the first piston 11*a* is moved in the direction of B whereby the low-pressure concentrated water is discharged to the low-pressure concentrated water discharge pipe 5.

If the first piston 11*a* is moved in the direction of B and the second piston 11*b* is moved in the direction of A, the first high-pressure concentrated water pilot valve 74*a* and the second low-pressure concentrated water pilot valve 76*b* are opened so that the high-pressure concentrated water is introduced into the second block inlet hole 742*b*.

Then, the fluctuating plate-like concentrated water valve 63 is rotated in the direction of D by the high pressure of the introduced concentrated water, and the low-pressure concentrated water accommodated in the space 641 is discharged to the second low-pressure concentrated water pilot 75*b* through the first block outlet hole 643*b*.

The first concentrated water chamber port 61*a* and the concentrated water supply hole 62*a* are communicated with each other and the second concentrated water chamber port 61*b* and the concentrated water outlet hole 62*b* are communicated with each other, by rotation of the fluctuating plate-like concentrated valve 63.

The high-pressure seawater discharge pipe 3 and the first power recovery chamber 1*a* are communicated with each other by closing the first check valve 21*a* and opening the second check valve 21*b*, and the low-pressure seawater supply pipe 2 and the second power recovery chamber 1*b* are communicated with each other by closing the third check valve 21*c* and opening the fourth valve 21*d*.

Accordingly, as illustrated in FIG. 5, when the high-pressure concentrated water is introduced into the first power recovery chamber 1*a*, the first piston 11*a* is moved in the direction of A whereby the high-pressure seawater is discharged to the high-pressure seawater discharge pipe 3, and when the low-pressure seawater is introduced from the low-pressure seawater supply pipe 2 into the second power recovery chamber 1*b*, the second piston 11*b* is moved in the direction of B whereby the low-pressure concentrated water is discharged to the low-pressure concentrated water discharge pipe 5.

During repetition of the processes, the concentrated water is alternately introduced and discharged into and from the first power recovery chamber and the second power recovery chamber and the seawater is alternately introduced and discharged, so that the seawater is pressurized and supplied to the high-pressure seawater discharge pipe by self-reciprocating the pistons with any separate electric drive force.

Figure 7:
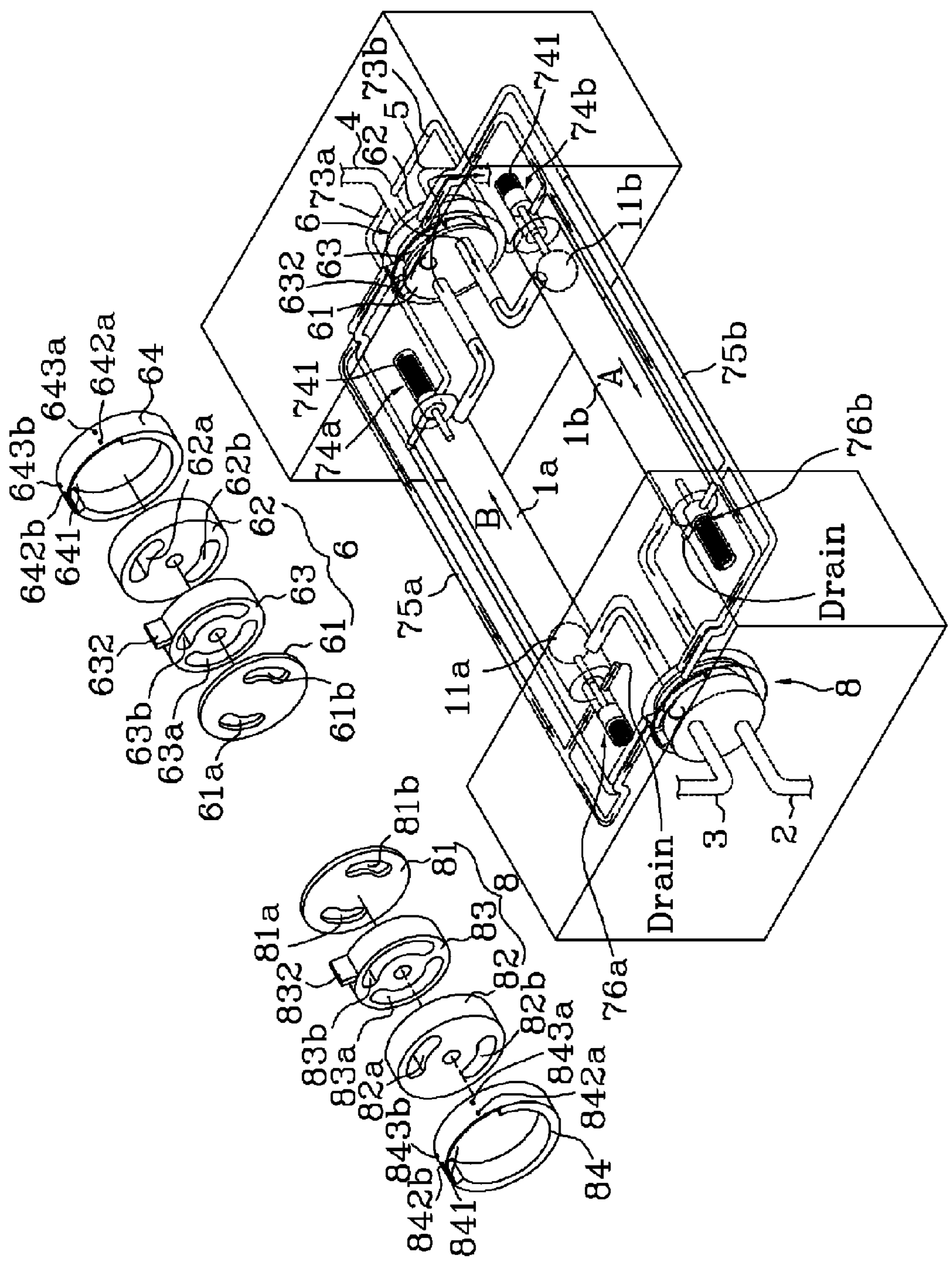
FIGS. 7 and 8 are views illustrating the structure and operation of a self-reciprocating energy recovery device according to the fourth embodiment of the present invention.
Figure 8:
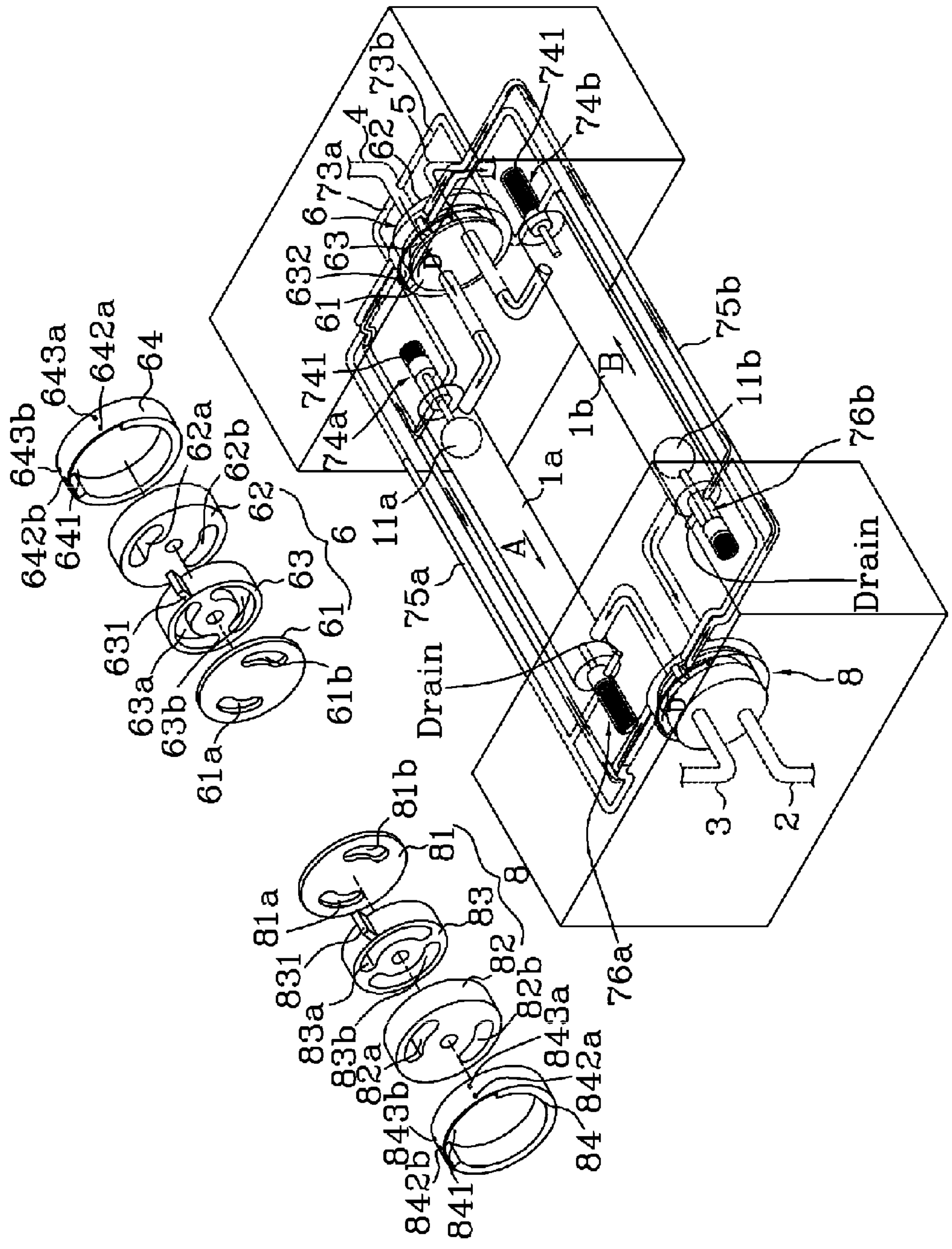

FIGS. 7 and 8 are views illustrating the structure and operation of a self-reciprocating energy recovery device according to the fourth embodiment of the present invention. In this case, detailed descriptions of the same structure and operation as those of the first and second embodiments of the present invention will be omitted.

Referring to FIGS. 7 and 8, the self-reciprocating energy recovery device according the fourth embodiment of the present invention includes a fluctuating plate-like check valve block 8. In the fluctuating plate-like check valve block 8, a seawater chamber cover 812, a seawater inlet/outlet cover 82, and a fluctuating plate-like check valve 83 function as a hydrostatic bearing by the pressure of supplied water. The seawater chamber cover 81 and the seawater inlet/outlet cover 82 have been described in detail in the second embodiment of the present invention, and detailed descriptions thereof will be omitted.

In this case, the fluctuating plate-like check valve 83 is provided on one side of the power recovery chambers 1*a* and 1*b*, and a fixed vane 632 is formed at the outer periphery of the fluctuating plate-like check valve 83.

The fluctuating plate-like check valve 83 is inserted into a check valve block 84 having a space 841 in which the fixed vane 832 is accommodated to selectively interrupt introduction and discharge of the seawater into the first power recovery chamber 1*a* and the second power recovery chamber 1*b* through fluctuating thereof.

A first check valve inlet hole 842*a* and a first check valve outlet hole 842*b*, and a second check valve inlet hole 843*a* and a second check valve outlet hole 843*b* are symmetrically formed on opposite sides of the space 841 in the check valve block 84.

Then, the first and second high-pressure concentrated water pilots 73*a* and 73*b* alternately supplying the high-pressure concentrated water are connected to the first and second check valve inlet holes 842*a* and 842*b*.

The first and second low-pressure concentrated water pilots 75*a* and 75*b* alternately discharging the low-pressure concentrated water are connected to the first and second check valve outlet holes 843*a* and 843*b*.

Hereinafter, the operation of the self-reciprocating energy recovery device according to the fourth embodiment of the present invention will be simply described.

As illustrated in FIG. 7, if the piston 11*a* of the first power recovery chamber 1*a* is moved in the direction of A and the piston 11*b* of the second power recovery chamber 1*b* is moved in the direction of B, the second high-pressure concentrated water pilot valve 74*b* and the first low-pressure concentrated water pilot valve 76*a* are opened so that the high-pressure concentrated water is introduced into the first block inlet hole 642*a* and the first check valve inlet hole 842*a*.

Then, the fluctuating plate-like concentrated water valve 63 and the fluctuating plate-like check valve 83 are rotated in the direction of C by the high-pressure due to the concentrated water introduced into the first block inlet hole 642*a* and the first check valve inlet hole 842*a* whereby the low-pressure concentrated water is discharged through the second block outlet hole 643*b* and the second check valve outlet hole 843*b* and through the first low-pressure concentrated water pilot 75*a*.

The second concentrated water chamber port 61*b* and the concentrated water supply hole 62*a* are communicated with each other and the first concentrated water chamber port 61*a* and the concentrated water discharge hole 62*b* are communicated with each other, by rotation of the fluctuating plate-like concentrated water valve 63.

Accordingly, as illustrated in FIG. 8, when the high-pressure concentrated water is introduced into the second power recovery chamber 1*b*, the second piston 11*b* is moved in the direction of A whereby the high-pressure seawater is discharged to the high-pressure seawater discharge pipe 5, and when the low-pressure seawater is introduced from the low-pressure seawater supply pipe 2 into the first power recovery chamber 1*a*, the first piston 11*a* is moved in the direction of B whereby the low-pressure concentrated water is discharged to the low-pressure concentrated water discharge pipe 5.

If the first piston 11*a* is moved in the direction of B and the second piston 11*b* is moved in the direction of A, the first high-pressure concentrated water pilot valve 74*a* and the second low-pressure concentrated water pilot valve 76*b* are opened so that the high-pressure concentrated water is introduced into the second block inlet hole 642*b* and the second check valve inlet hole 842*b*.

Then, the fluctuating plate-like concentrated water valve 63 and the fluctuating check valve 83 are rotated in the direction of D by the high pressure of the introduced concentrated water, whereby the low-pressure concentrated water accommodated in the space 841 is discharged to the second low-pressure concentrated water pilot 75*b* through the first block outlet hole 643*a* and the first check valve outlet hole 843*a*.

The first concentrated water chamber port 61*a* and the concentrated water supply hole 62*a* are communicated with each other and the second concentrated water chamber port 61*b* and the concentrated water outlet hole 62*b* are communicated with each other by rotation of the fluctuating plate-like concentrated water valve 63.

Accordingly, as illustrated in FIG. 7, when the high-pressure concentrated water is introduced into the first power recovery chamber 1*a*, the first piston 11*a* is moved in the direction of A whereby the high-pressure seawater is discharged to the high-pressure seawater discharge pipe 3, and when the low-pressure seawater is introduced into the second power recovery chamber 1*b*, the second piston 11*b* is moved in the direction of B whereby the low-pressure concentrated water is discharged to the low-pressure concentrated water discharge pipe 5.

During repetition of the processes, the concentrated water is alternately introduced and discharged into and from the first power recovery chamber and the second power recovery chamber and the seawater is alternately introduced and discharged, so that the seawater is pressurized and supplied to the high-pressure seawater discharge pipe by self-reciprocating the pistons with any separate electric drive force.

While the invention has been shown and described with respect to the exemplary embodiments, it will be understood by those skilled in the art that the system and the method are only examples of the present invention and various changes and modifications may be made without departing from the spirit and scope of the invention as defined in the following claims.

What is claimed is:

1. A self-reciprocating energy recovery device including a pair of power recovery chambers having pistons therein respectively, a high-pressure concentrated supply pipe, a low-pressure concentrated discharge pipe, and a high-pressure seawater discharge pipe to enable the power recovery chambers to recover hydraulic power supplied through the high-pressure concentrated water supply pipe and utilize the hydraulic power in driving of a seawater pump, the energy recovery device comprising:

a concentrated water control valve block selectively interrupting introduction and discharge of concentrated water to and from the power recovery chambers through fluctuation of a fluctuating plate-like concentrated water valve having pinion gear teeth on the outer peripheral surface thereof;

a rack gear having rack gear teeth enmeshed with the pinion gear teeth and inserted into opposite spools;

first and second high-pressure concentrated water pilots branched out from the high-pressure concentrated water supply pipe to pilots and connected to sides of the spools to alternately supply high-pressure concentrated water;

first and second high-pressure concentrated water pilot valve interrupting supply of high-pressure concentrated water to the first and second high-pressure concentrated water pilots respectively;

first and second low-pressure concentrated water pilots connected to opposite sides of the spools to discharge low-pressure concentrated water; and first and second low-pressure concentrated water pilot valves interrupting discharge of low-pressure concentrated water through the first and second low-pressure concentrated water pilots.

2. The self-reciprocating energy recovery device of claim 1, wherein the concentrated water control valve block includes:

a concentrated water chamber cover having chamber ports communicated with the power recovery chambers respectively;

a concentrated water inlet/outlet cover having a concentrated water supply hole communicated with the high-pressure concentrated water supply pipe and a concentrated water outlet hole communicated with the low-pressure concentrated water supply pipe; and a fluctuating plate-like concentrated water valve functioning as a hydrostatic bearing by a pressure of supplied water between the concentrated water chamber cover and the concentrated water inlet/outlet cover and having opened holes.

3. The self-reciprocating energy recovery device of claim 1, further comprising a fluctuating plate-like check valve block provided on one side of the power recovery chambers and connected to the fluctuating plate-like concentrated water valve, the fluctuating plate-like check valve block being moved in association with the fluctuation of the fluctuating plate-like concentrated valve to selectively interrupt introduction and discharge of seawater to and from the first power recovery chamber and the second power recovery chamber.

4. The self-reciprocating energy recovery device of claim 3, wherein the fluctuating plate-like check valve block includes:

a seawater chamber cover having chamber ports communicated with the power recovery chambers respectively;

a seawater inlet/outlet cover having a seawater supply hole connected to the low-pressure seawater supply pipe and a seawater outlet hole connected the high-pressure seawater discharge pipe; and a fluctuating plate-like concentrated water valve functioning as a hydrostatic bearing by a pressure of supply water between the seawater chamber cover and the seawater inlet/outlet cover and having opened holes.

5. The self-reciprocating energy recovery device of claim 1, wherein the first and second high-pressure concentrated water pilot valves and the first and second low-pressure concentrated water pilot valves pass through sides of the power recovery chambers and are connected to resilient members outside the power recovery chambers.

6. The self-reciprocating energy recovery device of claim 2, wherein the first and second high-pressure concentrated water pilot valves and the first and second low-pressure concentrated water pilot valves pass through sides of the power recovery chambers and are connected to resilient members outside the power recovery chambers.

7. The self-reciprocating energy recovery device of claim 3, wherein the first and second high-pressure concentrated water pilot valves and the first and second low-pressure concentrated water pilot valves pass through sides of the power recovery chambers and are connected to resilient members outside the power recovery chambers.

8. The self-reciprocating energy recovery device of claim 4, wherein the first and second high-pressure concentrated water pilot valves and the first and second low-pressure concentrated water pilot valves pass through sides of the power recovery chambers and are connected to resilient members outside the power recovery chambers.

9. A self-reciprocating energy recovery device including a pair of power recovery chambers having pistons therein respectively, a high-pressure concentrated supply pipe, a low-pressure concentrated discharge pipe, and a high-pressure seawater discharge pipe to enable the power recovery chambers to recover hydraulic power supplied through the high-pressure concentrated water supply pipe and utilize the hydraulic power in driving of a seawater pump, the energy recovery device comprising:

- a fluctuating plate-like concentrated water valve having a fixed vane to selectively interrupt introduction and discharge of concentrated water to and from the first power recovery chamber and the second power recovery chamber through fluctuation thereof;
- a fluctuating plate-like concentrated water valve block having a space into which the fluctuating plate-like concentrated water valve and in which the fixed vane is accommodated and a first block outlet hole and a first block inlet hole, and a second block outlet hole and a second block inlet hole symmetrically disposed on opposite sides of the space;
- first and second high-pressure concentrated water pilots branched out from the high-pressure concentrated water supply pipe to pilots and connected to the first and second block inlet holes to alternately supply the high-pressure concentrated water;
- first and second high-pressure concentrated pilot valves interrupting supply of high-pressure concentrated water to the first and second high-pressure concentrated water pilots;
- first and second low-pressure concentrated water pilots connected to the first and second block outlet holes to alternately discharge the low-pressure concentrated water; and
- first and second low-pressure concentrated water pilot valves interrupting discharge of low-pressure concentrated water through the first and second low-pressure concentrated water pilots.

10. The self-reciprocating energy recovery device of claim 9, wherein the fluctuating plate-like concentrated water valve block includes:

- a concentrated water chamber cover having chamber ports communicated with the power recovery chambers respectively;
- a concentrated water inlet/outlet cover having a concentrated water supply hole communicated with the high-pressure concentrated water supply pipe and a concentrated water outlet hole communicated with the low-pressure concentrated water supply pipe; and
- a fluctuating plate-like concentrated water valve functioning as a hydrostatic bearing by a pressure of supplied water between the concentrated water chamber cover and the concentrated water inlet/outlet cover and having opened holes.

11. The self-reciprocating energy recovery device of claim 10, further comprising:

- a fluctuating plate-like check valve provided on one side of the power recovery chambers and having a fixed vane at the outer periphery thereof to selectively interrupt introduction and discharge of seawater into and from the first power recovery chamber and the second power recovery chamber through fluctuation thereof;
- a fluctuating plate-like concentrated water valve block having a space into which the fluctuating plate-like concentrated water valve and in which the fixed vane is accommodated and a first block outlet hole and a check valve block having a first block inlet hole, and a second block outlet hole and a second block inlet hole symmetrically disposed on opposite sides of the space;
- wherein the first and second high-pressure concentrated water pilots alternately supplying high-pressure concentrated water are connected to the first and second check valve inlet holes, and first and second low-pressure concentrated water pilots alternately discharging low-pressure concentrated are connected to the first and second check valve outlet holes.

12. The self-reciprocating energy recovery device of claim 11, wherein the fluctuating plate-like check valve block includes:

- a seawater chamber cover having chamber ports communicated with the power recovery chambers respectively;
- a seawater inlet/outlet cover having a seawater supply hole connected to the low-pressure supply pipe and a seawater outlet hole connected to the high-pressure seawater discharge pipe; and
- a fluctuating plate-like check valve functioning as a hydrostatic bearing by a pressure of supply water between the seawater chamber cover and the seawater inlet/outlet cover and having opened holes.

13. The self-reciprocating energy recovery device of claim 9, wherein the first and second high-pressure concentrated water pilot valves and the first and second low-pressure concentrated water pilot valves pass through sides of the power recovery chambers and are connected to resilient members outside the power recovery chambers.

14. The self-reciprocating energy recovery device of claim 10, wherein the first and second high-pressure concentrated water pilot valves and the first and second low-pressure concentrated water pilot valves pass through sides of the power recovery chambers and are connected to resilient members outside the power recovery chambers.

15. The self-reciprocating energy recovery device of claim 11, wherein the first and second high-pressure concentrated water pilot valves and the first and second low-pressure concentrated water pilot valves pass through sides of the power recovery chambers and are connected to resilient members outside the power recovery chambers.

16. The self-reciprocating energy recovery device of claim 12, wherein the first and second high-pressure concentrated water pilot valves and the first and second low-pressure concentrated water pilot valves pass through sides of the power recovery chambers and are connected to resilient members outside the power recovery chambers.

* * * * *